US006969172B2

(12) United States Patent
Actis-Datta

(10) Patent No.: US 6,969,172 B2
(45) Date of Patent: Nov. 29, 2005

(54) SAFETY GLASSES WITH FLEXIBLE FRAME AND INTERCHANGEABLE DUAL-LENSES

(75) Inventor: Sebastien Yvan Actis-Datta, Villars-Tiercelin (CH)

(73) Assignee: Bacou-Dalloz Eye & Face Protection, Inc., Smithfield, RI (US)

( * ) Notice: Subject to any disclaimer, the term of this patent is extended or adjusted under 35 U.S.C. 154(b) by 0 days.

(21) Appl. No.: 10/917,125

(22) Filed: Aug. 12, 2004

(65) Prior Publication Data

US 2005/0036101 A1 Feb. 17, 2005

Related U.S. Application Data

(60) Provisional application No. 60/495,072, filed on Aug. 14, 2003.

(51) Int. Cl.[7] ............................................. G02C 1/00
(52) U.S. Cl. ........................................ 351/86; 351/83
(58) Field of Search .............................. 351/86, 83, 85, 351/106, 103, 90, 92, 142, 154, 41

(56) References Cited

U.S. PATENT DOCUMENTS

| | | | |
|---|---|---|---|
| 3,838,914 A | 10/1974 | Fernandez | 351/106 |
| 4,196,982 A | 4/1980 | Watkins | 351/86 |
| 4,338,004 A | 7/1982 | Vosper | 351/47 |
| 4,504,127 A | 3/1985 | Cottet | 351/86 |
| 4,730,915 A | 3/1988 | Jannard | 351/47 |
| 4,759,622 A | 7/1988 | Schmidthaler | 351/86 |
| 4,834,523 A | 5/1989 | Porsche | 351/57 |
| 5,257,050 A | 10/1993 | Wiedner | 351/86 |
| 5,467,148 A | 11/1995 | Conway | 351/85 |
| 5,526,069 A | 6/1996 | Tseng | 351/86 |
| 5,576,777 A | 11/1996 | Gioacchini | 351/86 |
| 5,587,747 A | 12/1996 | Bernheiser | 351/105 |
| 5,617,588 A | 4/1997 | Canavan et al. | 2/428 |
| 5,703,669 A | 12/1997 | Park | 351/86 |
| 5,815,235 A | 9/1998 | Runckel | 351/92 |
| 5,900,922 A | 5/1999 | Moore | 351/103 |
| 6,059,409 A | 5/2000 | Sheldon | 351/106 |
| 6,074,059 A | 6/2000 | Glass et al. | 351/86 |
| 6,186,623 B1 | 2/2001 | Giacomuzzo | 351/106 |
| 6,196,681 B1 | 3/2001 | Canavan | 351/106 |
| 6,210,001 B1 | 4/2001 | Huang | 351/86 |
| 6,227,665 B1 | 5/2001 | Pernicka et al. | 351/86 |
| 6,340,226 B1 | 1/2002 | Akaba et al. | 351/106 |
| 6,357,872 B1 | 3/2002 | Chu | 351/106 |
| 6,460,996 B2 | 10/2002 | Okui et al. | 351/86 |
| 6,517,202 B2 | 2/2003 | Huang | 351/103 |
| 6,550,912 B2 | 4/2003 | Vitaloni | 351/47 |
| 6,592,220 B1 | 7/2003 | Cheong | 351/106 |
| 6,601,954 B2 | 8/2003 | Menon | 351/86 |
| 2002/0109818 A1 | 8/2002 | Okui et al. | 351/86 |
| 2003/0048407 A1 | 3/2003 | Rivera | 351/135 |

Primary Examiner—Hung Xuan Dang
(74) Attorney, Agent, or Firm—Barlow, Josephs & Holmes, Ltd.

(57) ABSTRACT

Safety eyewear (10) having interchangeable lens(es) (28,30) is provided. To provide for interchange of the lenses (28,30) in the frame (12), upper and lower frame members (32,34) are molded from a harder, more rigid plastic while lateral temple portions (20,22), and a central nose bridge portion (18) are molded from a softer, more elastic material. The entire frame structure (12) is preferably molded as a unitary piece to form a unitary frame having rigid upper and lower frame portions (32,34) joined by flexible intermediate portions (18,20,22). In this regard, the upper and lower frame portions (32,34) can be flexed or stretched relative to each other to temporarily separate the frame portions (32,34) and open up the lens openings (24,26).

18 Claims, 4 Drawing Sheets

SAFETY GLASSES WITH FLEXIBLE FRAME AND INTERCHANGEABLE DUAL-LENSES

CROSS-REFERENCE TO RELATED APPLICATIONS

This application claims the benefit of U.S. Provisional Patent Application No. 60/495,072 having a filing date of Aug. 14, 2003, the entire contents of which are hereby incorporated by reference.

BACKGROUND OF THE INVENTION

The instant invention relates to safety eyewear and more particularly to safety eyewear having lenses that can be removed quickly and easily.

Individuals need to wear safety glasses in many different fields of work. As a result, the eyewear industry has developed a variety of safety eyewear products, and there are many numerous types of safety glasses commercially available. The industry has designed safety eyewear for use in particular work applications and environments. For example, workers in metal-machining operations wear safety eyewear designed to protect their eyes from flying metal shards and other debris. In chemical industries, workers wear safety eyewear designed to protect them from chemical splashes and spills. Also, technicians, who operate lasers, wear safety eyewear designed to protect their eyes from exposure to light emitted from the laser. Because lasers can emit light at different wavelengths, a variety of lenses each specifically designed for filtering light at a particular wavelength may be required.

In recent years, there has been a tremendous growth in safety regulations requiring individuals to wear safety eyewear while participating in many different activities. Many of these safety eyewear products have dual-lenses attached to the frame. The dual-lenses act as shields protecting the eyes of a person wearing the eyewear. Now, customers of safety eyewear products have grown interested in eyeglasses having interchangeable lenses. In many instances, it is more cost-effective and convenient to purchase and store a variety of lenses than to purchase and store many different safety glasses. With safety eyewear having replaceable lenses, a person can remove and install a lens based on a particular job task or other reason. For example, a person can replace soiled and damaged lenses with new lenses. Also, a person can change the color and style of the lenses for fashion reasons.

Some eyewear products having interchangeable dual-lenses have been developed. For example, Watkins, U.S. Pat. No. 4,196,982 discloses safety glasses having a plastic frame with releasable dual-lenses. The frame is made preferably of a rigid, resinous material exhibiting plastic memory. The lens-receiving channels have V-shaped cross-sections with a variable depth. Each lens has a double-bevel periphery. The '982 patent describes a method for removing a lens, wherein a person grasps the frame and applies thumb pressure on the back of the lens at a point where the lens-receiving channel is at a reduced depth. This pressure disengages the lens from the lens-receiving channel and the lens is removed.

Tseng, U.S. Pat. No. 5,526,069 discloses eyeglasses having replaceable dual-lenses. The eyeglasses include a frame and two lens holes for receiving the lenses. The lenses have the same shapes as the lens holes including a wedge-shaped portion on one side and a nearly-round portion on the other side. The '069 patent describes a method for removing a lens, wherein a person pushes on the nearly-round fitting portion of the lens until it is separated from the lens hole.

Gioacchini, U.S. Pat. No. 5,576,777 discloses eyeglasses with interchangeable dual-lenses. The eyeglasses include a frame made of a plastic material. The frame includes elastically deformable rings having internal snap-fitting grooves for holding the lenses. The '777 patent describes the rings as being pressed into supports through elastic interference in such a way that the lenses are connected structurally to the frame, but the lenses can be removed through the action of the snap-fitting connection.

Glass et al., U.S. Pat. No. 6,074,059 discloses eyewear having a frame with dual-lens openings. A lens is mounted in each lens opening by pushing the lens over a compressible bezel having a first barrier and second barrier. The first barrier is sufficiently high enough to prevent the lens from being pushed all the way through the frame. The second barrier is of sufficient height and resilience to allow the lens to be removed by forcing the lens back over the second barrier without damaging the frame.

Giacomuzzo, U.S. Pat. No. 6,186,623 discloses protective spectacles and sport goggles having interchangeable dual-lenses. The frame includes a pair of rims linked together by a nosepiece. The rims include grooves for receiving the lenses. The grooves are interrupted by a locking pip so that, upon bending the front piece of the frame slightly, a lens can be removed by articulation with the locking pip.

Although some conventional eyewear is made with interchangeable dual-lenses, it still can be difficult to remove and replace such lenses efficiently in some instances. A person may need special tools to remove such lenses. Also, a person may need to grasp the lenses repeatedly while attempting to remove them from the eyewear frame. This constant handling may lead to soiling or damaging of the lenses. Moreover, some eyewear frames may not hold the lenses securely in place during normal use.

In view of the foregoing, there is a need for improved eyewear having interchangeable dual-lenses. The eyewear should have sufficient resiliency so that the lenses are held tightly within the frame during normal activities. At the same time, a person should be capable of flexing the frame to remove and replace the lenses quickly and easily. The present invention provides such improved eyewear. These and other objects, features, and advantages of this invention are evident from the following description and attached figures.

SUMMARY OF THE INVENTION

The present invention relates to eyewear having interchangeable dual-lenses that can be replaced quickly and easily. The eyewear is particularly suitable for use as safety eyeglasses allowing wearers to change lenses in view of different job tasks or other reasons. The eyewear includes a unitary frame structure having first and second lens openings, a nose bridge portion, first and second outer lateral portions, and upper and lower frame members. Each frame member extends from the first lateral portion to the second lateral portion.

To provide for interchange of the lenses in the frame, the frame is provided with upper and lower frame portions respectively, molded from a harder, more rigid plastic. The rigid upper and lower frame portions are joined together at the lateral temple bar portions, and at the central nose bridge with a softer, more elastic plastic. The entire frame structure is preferably molded as a unitary piece using a two-shot molding process to form a unitary frame having rigid upper and lower frame portions joined by flexible intermediate portions. In this regard, the upper and lower frame portions can be flexed or stretched relative to each other to temporarily separate the frame portions and open up the lens openings. Alternatively, an insert molding process could be utilized with the same or similar results.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
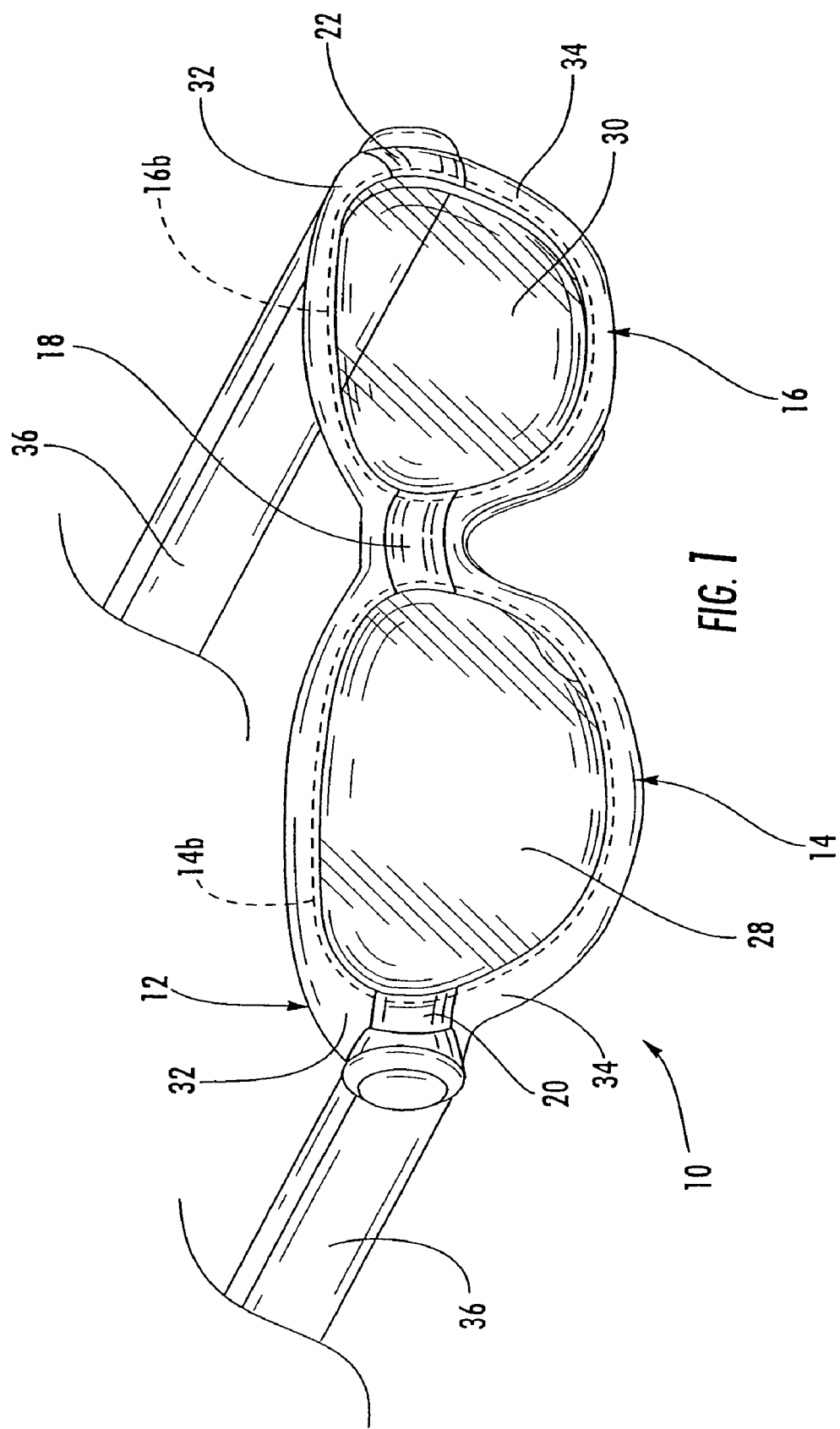
FIG. 1 is a front perspective view of an eyewear article according to the present invention showing the lenses in a fully mounted position within the frame.
Figure 2:
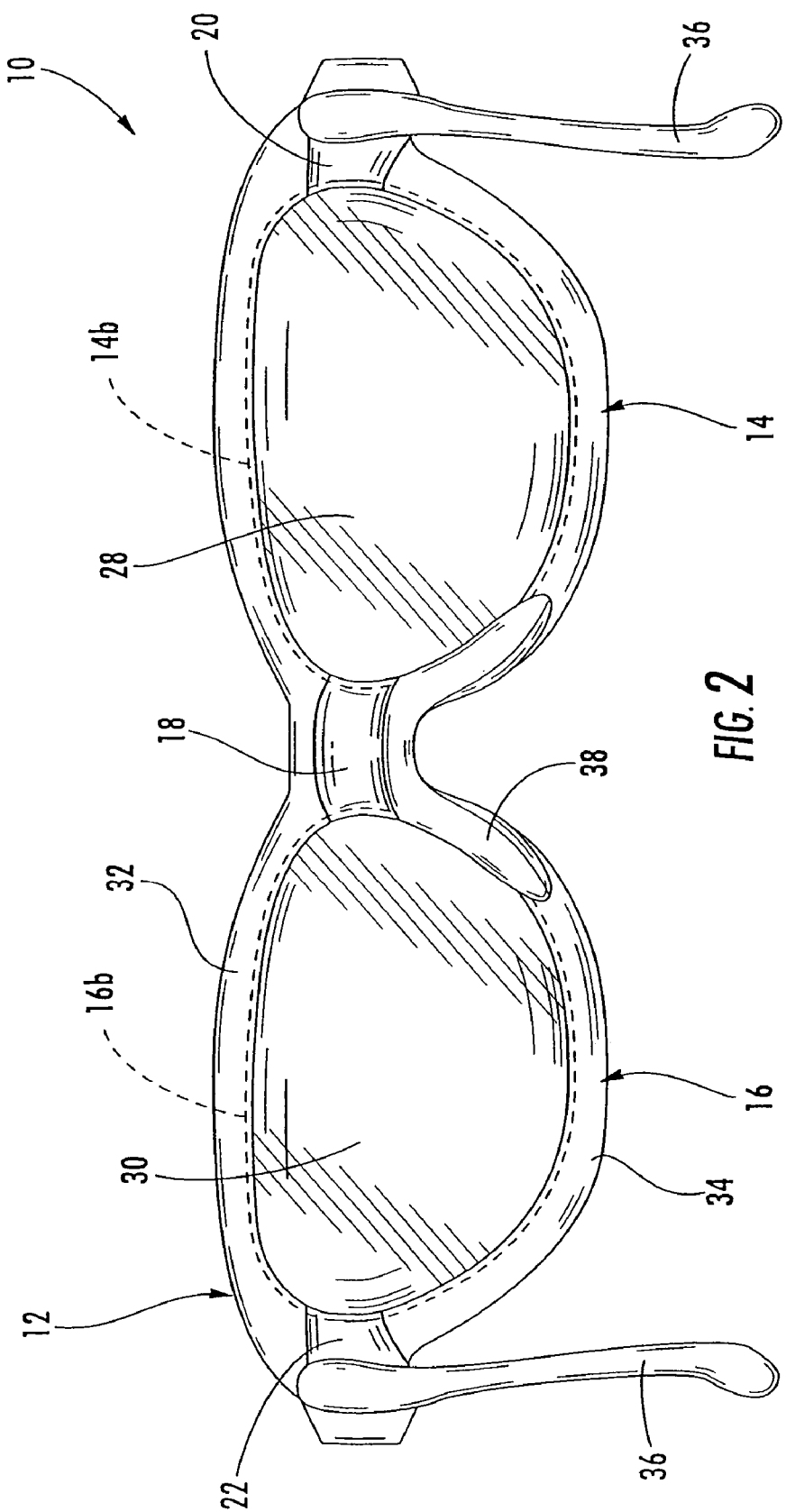
FIG. 2 is a rear plan view thereof.
Figure 3:
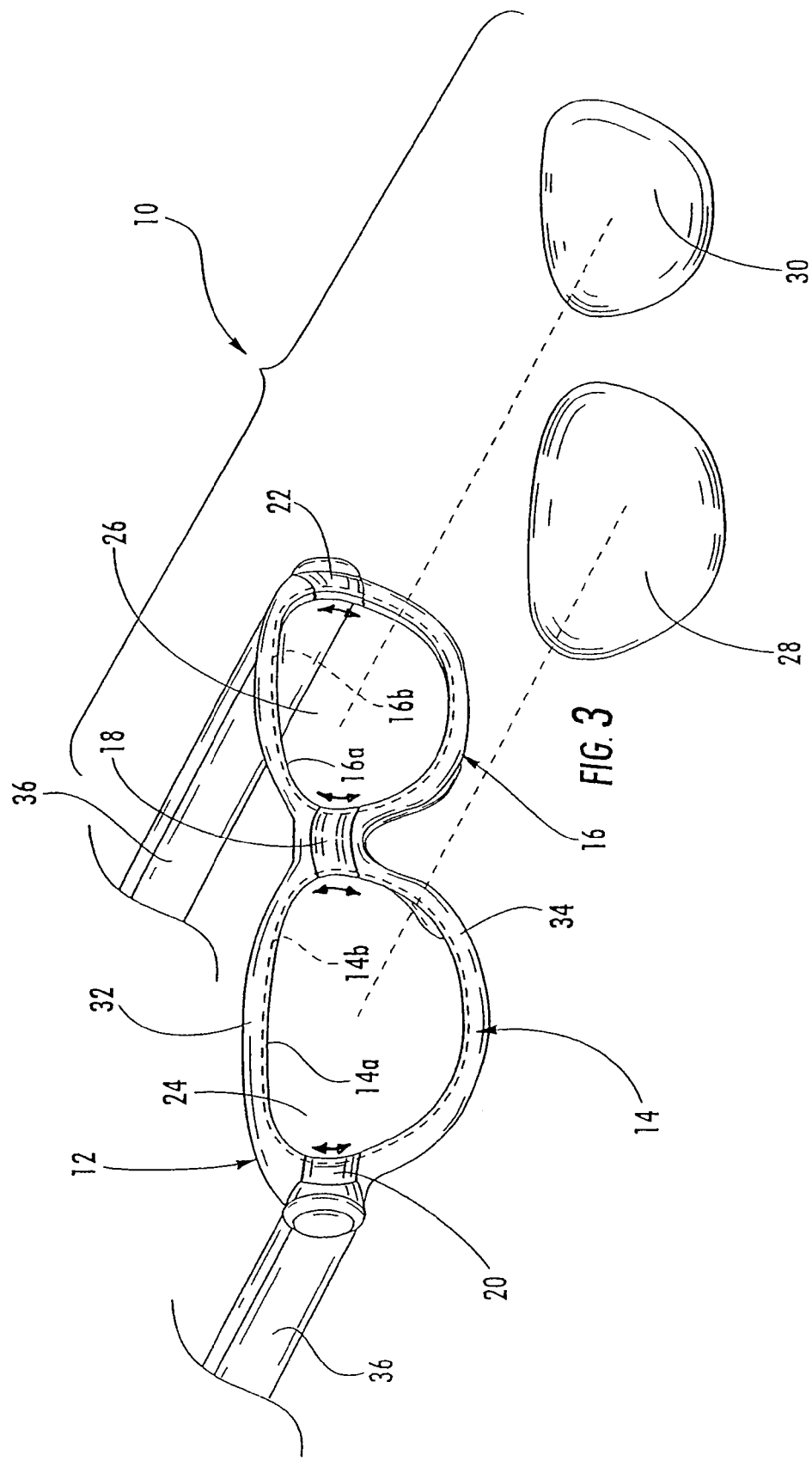
FIG. 3 is a front perspective view of an eyewear article according to the present invention showing the flexing of the frame and removal of the lenses.

Referring now to the drawings, the eyewear of the instant invention is illustrated and generally indicated at 10 in FIGS. 1–3. As will be hereinafter more fully described, the instant eyewear 10 offers a simple and cost-effective solution to the problem of changing lenses in eyewear, and particularly in dual-lens eyewear. The eyewear 10 of this invention is described herein primarily as safety glasses, but it is understood that other eyewear such as sunglasses, and goggles can also be made in accordance with this invention.

The safety glasses 10 include a frame generally indicated at 12. The frame 12 is a unitary structure that is constructed from two different molded plastic materials as discussed in further detail below. The frame 12 includes a right lens frame generally indicated at 14 and a left lens frame generally indicated at 16. The terms, "right", "left", "upper", and "lower" and similar terms are used herein with reference to the safety glasses shown in FIG. 1 as if a person was wearing the glasses. These terms are used solely for illustrative purposes and should not be construed as limiting the scope of the invention. The right lens frame 14 and left lens frame 16 are connected by a central nose bridge portion 18. The right frame 14 includes a first outer lateral portion 20 and the left frame 16 includes a second outer lateral portion 22.

Each lens frame 14 and 16 has an inner edge 14a and 16a defining a right lens opening 24 and a left lens opening 26 respectively. The lens openings 24 and 26 are visible in FIG. 3. The lenses 28 and 30 can be mounted removably within the lens openings 24 and 26 in accordance with this invention. The lenses 28 and 30 are captured within a continuous groove 14b and 16b (shown in dotted lines) formed along the inner edges 14a and 16a of the lens openings 24 and 26. The grooves 14b and 16b form pockets for receiving and engaging the edges of the lenses 28 and 30.

A durable, high impact-resistant polycarbonate material typically is used to make the safety lenses 28 and 30, although it is recognized that other materials may be used. The lenses 28 and 30 can be coated, colored, tinted, or the like depending on the intended use of the lenses. Also, the lenses 28 and 30 can be constructed in a variety of geometric shapes.

The unitary frame 12 includes an upper frame section 32 and a lower frame section 34. The upper frame section 32 extends from the first lateral portion 20 to the second lateral portion 22. Likewise, the lower frame section 34 also extends from the first lateral portion 20 to the second lateral portion 22. Thus, the upper frame section 32 and lower frame section 34 are conjoined at the nose bridge portion 18 and first and second lateral portions 20 and 22.

In addition, temple bars 36 can extend rearwardly from the outer side edges of the frame 12. The temple bars 36 are pivotally attached to the frame by pins, screws, or other conventional means. One temple bar 36 is attached to the frame 12 in the area of the first lateral portion 20. The other temple bar 36 is attached to the frame 12 in the area of the second lateral portion 22. The frame 12 also may include a nose piece 38 extending downwardly from the nose bridge portion 18 of the frame 12.

In the instant invention, the entire frame structure 12, which includes nose bridge section 18, first and second lateral section 20 and 22, and upper and lower frame sections 32 and 34, is preferably molded as a single piece. A "two-shot" molding process is preferably used preferably to fabricate this unitary frame structure 12. This two-shot molding process forms a single piece frame having relatively rigid upper and lower frame sections 32 and 34 joined to a relatively elastomeric nose bridge section 18 and elastomeric lateral sections 20 and 22.

Two-shot molding processes are used in the art for making other components of eyewear products. For example, Canavan et al., U.S. Pat. No. 5,617,588, the disclosure of which is hereby incorporated by reference, describes safety goggles having a rigid frame portion made from a hard plastic material and a resilient face-engaging portion made from a soft rubbery material. A two-shot injection molding process is used to construct the safety goggles. In Canavan, U.S. Pat. No. 6,196,681, the disclosure of which is hereby incorporated by reference, eyeglasses having a brow bar with a hard outer portion chemically bonded to a soft inner portion are described. A two-shot molding process is used to make the hard and soft portions of the brow bar.

In the instant invention, the upper and lower frame sections 32 and 34 are made from a relatively hard, rigid material. Any suitable hard material can be used so long as it provides the frame members 32 and 34 with sufficient mechanical strength and durability. For example, nylons, polyolefins, and polycarbonates can be used to make the upper and lower frame sections 32 and 34.

In contrast to the relatively rigid frame sections 32 and 34, the nose bridge section 18 and the first and second outer lateral sections 20 and 22 are made from a relatively soft, elastomeric material. Any suitable soft material can be used so long as it provides the nose bridge 18 and lateral sections 20 and 22 with sufficient flexibility. For example, rubbers, silicones, thermoplastic elastomers, and other elastomeric materials can be used. The elastomeric material used to make the nose bridge section 18 and lateral sections 20 and 22 is soft and pliable relative to the hard materials used to make the frame members 32 and 34. Of course, the frame members 32 and 34 also will possess some degree of flexibility, but these members 32 and 34 generally will be more rigid relative to the nose bridge 18 and lateral sections 20 and 22.

The two-shot molding process causes the relatively hard frame sections 32 and 34 to chemically bond to the relatively soft nose bridge section 18 and lateral sections 20 and 22. Different two-shot molding processes can be used. For example, in one embodiment of a two-shot molding operation, a nylon material first may be injected into a mold to form the hard frame sections 32 and 34. The nylon material begins curing and cooling. Then, a rubbery material may be used to make the elastomeric sections 18, 20, and 22. The rubbery material may be injected into the mold while the molded frame sections 32 and 34 are still cooling. The rubbery material of the elastomeric sections 18, 20, and 22 chemically bonds with the still uncured nylon material of the frame sections 32 and 34. After appropriate cooling, the unitary frame structure 12 is removed from the mold.

The resulting frame 12 is an integrally molded structure having relatively rigid frame sections 32 and 34 securely joined together at relatively elastomeric sections 18, 20, and 22. This frame construction allows a person to stretch the frame sections 32,34 apart to remove and mount the lenses 28 and 30 in the eyeglasses 10 quickly and easily.

While dual-shot molding is described as the preferred process for forming the present frame 12, it is to be understood that other molding techniques, such as insert molding could also be equally effective for forming the same type of structure. In insert molding, either the elastomeric sections 18, or the rigid structural frame 12 of the eyewear would first be molded in one operation and cooled, and then these already molded pieces would be inserted into a second mold to add the opposing structures. Insert molding is also a well known process in the eyewear art.

In order to remove the lenses 28 and 30, a person can grasp the frame sections 32 and 34 with his or her fingers and apply pressure to flex the frame 12. Because of the elastomeric sections 18, 20, and 22, this pressure will cause the frame 12 to deform temporarily. More particularly, referring to FIG. 3, the upper and lower frame sections 32 and 34 can be stretched apart slightly (in the direction of the arrows). This flexing and stretching of the frame 12 usually will be sufficient to cause the lenses 28 and 30 to "pop-out" of the lens openings 24 and 26. But, if necessary, a person can give a slight push to the lenses 28 and 30 to disengage them. In order to install new lenses, the person repeats the same steps used to flex and stretch the frame 12 as described above. When the frame sections 32 and 34 are flexed and stretched apart sufficiently, the person can insert new lenses 28 and 30 into the lens openings 24 and 26.

The eyewear of this invention has several advantageous features. For instance, the frame has sufficient resiliency to hold the dual-lenses tightly in place so that a person can participate in sports, work, and other activities. Moreover, a person can remove the lenses and replace them with new lenses simply and quickly. No special tools are required to remove and install the lenses. The frame is a one-piece structure having relatively rigid and elastomeric portions. To remove the lenses, a person just needs to bend the frame sufficiently and the lenses will disengage from the lens openings. To install the lenses, a person just need to bend the frame sufficiently and insert the lenses in the lens openings.

Figure 4:
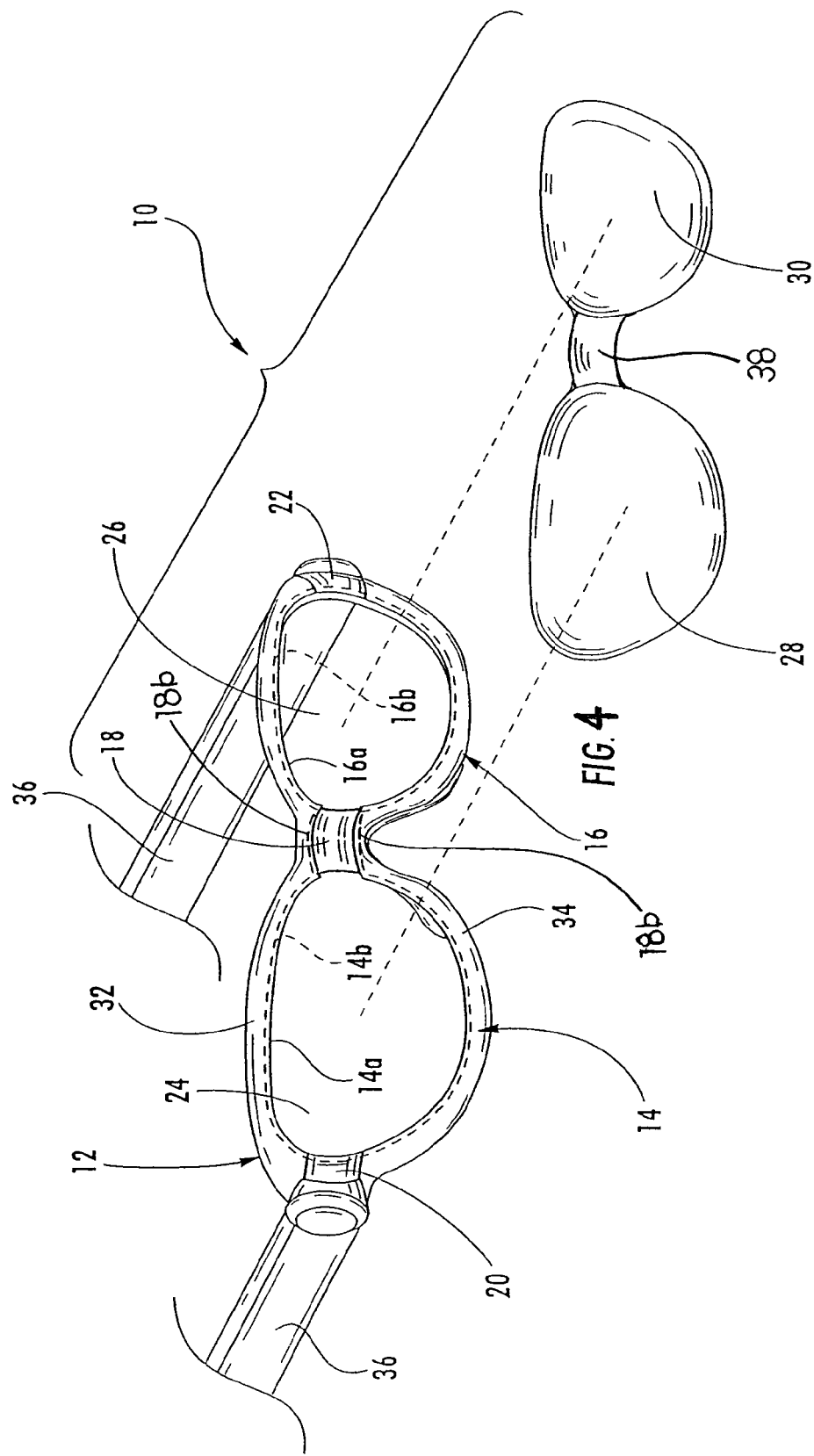
FIG. 4 is a front perspective view of an alternate embodiment of the eyewear article showing a single lens construction.

While the present invention is preferably illustrated and identified herein with regard to a dual lens eyewear product, it is also contemplated that the teachings of the present invention can be applied to a single lens eyewear. In such an eyewear configuration, as illustrated in FIG. 4, the lens panels 28,30 are integrally joined by a central lens bridge 38. The lens bridge 38 would be received in a groove 18b, extending across the flexible bridge portion 18, and formed as a continuation of the lens grooves 14b and 16b. In this regard, the flexible bridge portion 18 sits behind the central lens bridge 38. In any event, one skilled in the art can appreciate that the single lens concept uses the same general concept of an elastomeric flexible material interposed between rigid portions of the frame to provide relative movement of the rigid portions of the frame for insertion and removal of the lens(es).

It is appreciated by those skilled in the art that various changes and modifications can be made to the illustrated embodiments and description herein without departing from the spirit of the present invention. All such changes and modifications are intended to be covered by the appended claims.

What is claimed is:

1. Eyewear, comprising:
   a unitary frame having upper and lower rigid frame sections integrally joined at lateral side edges thereof by first and second lateral elastomeric sections, said rigid frame sections and said lateral elastomeric section cooperating to define at least one lens opening, and
   at least one lens removably mounted within the at least one lens opening,
   said upper and lower rigid frame sections being elastomerically and integrally joined by said first and second lateral elastomeric sections whereby said upper and lower frame sections are selectively movable between a first normal position wherein said unitary frame retains said at least one lens in said at least one lens opening, and a second stretched position wherein said elastomeric lateral sections are stretched and said at least one lens opening is enlarged such that said at least one lens can be removed from or inserted into said at least one lens opening.

2. The eyewear of claim 1 wherein said frame further includes an elastomeric bridge section, said upper and lower frame sections being further elastomerically joined by said elastomeric bridge section,
   said elastomeric bridge section cooperating with said upper and lower frame sections and said lateral sections to define first and second lens openings,
   said elastomeric bridge section being stretched when said frame is in said stretched position.

3. The eyewear of claim 2 wherein said at least one lens comprises a single lens retained within said first and second lens openings.

4. The eyewear of claim 2 wherein said at least one lens comprises first and second lenses respectively retained within said first and second lens openings.

5. A unitary eyewear frame comprising upper and lower rigid frame sections integrally joined at lateral side edges thereof by first and second lateral elastomeric sections, said rigid frame sections and said lateral elastomeric section cooperating to define at least one lens opening,
   said upper and lower rigid frame sections being elastomerically and integrally joined by said first and second lateral elastomeric sections whereby said upper and lower frame sections are selectively movable between a first normal position wherein said at least one lens opening is sized to respectively retain at least one lens therein, and a second deformed position wherein said elastomeric lateral sections are stretched and said at least one lens opening is respectively enlarged to allow removal or insertion of at least one lens into said at least one lens opening.

6. The unitary eyewear frame of claim 5 further comprising an elastomeric bridge section, said upper and lower frame sections being further elastomerically joined by said elastomeric bridge section, said elastomeric bridge section cooperating with said upper and lower frame sections and said lateral sections to define respective first and second lens openings said elastomeric bridge section being stretched when said frame is in said stretched position.

7. Eyewear having interchangeable dual-lenses, comprising:
- a unitary frame having first and second lens openings, a nose bridge section, first and second lateral sections, and upper and lower frame sections, each frame section extending from the first lateral section to the second lateral section;
- the nose bridge section and the first and second lateral sections each being made of a relatively elastomeric material, and the upper and lower frame section each being made of a relatively rigid material; and
- a first lens removably mounted within the first lens opening and a second lens removably mounted within the second lens opening.

8. The eyewear of claim 7, wherein the first and second lens openings each include a continuous groove for receiving the first and second lenses.

9. The eyewear of claim 7, wherein the frame further comprises a nose pad.

10. The eyewear of claim 7, wherein the frame further comprises a pair of temple bars pivotally attached to side edges of the frame.

11. An eyewear frame for use with dual interchangeable lenses comprising:
- a unitary frame defining first and second lens openings for receiving lenses therein,
- said unitary frame being formed by a molding process wherein said frame includes an upper frame section formed from a plastic material and a lower frame section formed from a plastic material,
- said upper and lower frame sections being elastomerically joined at a bridge section, and at first and second lateral sections whereby said upper and lower frame sections are selectively movable between a first normal position wherein said unitary frame retains said lenses in said lens openings, and a second deformed position wherein said elastomeric sections are stretched and said lenses can be removed from or inserted into said lens openings.

12. The eyewear frame of claim 11, wherein the first and second lens openings each include a continuous groove for receiving the first and second lenses.

13. The eyewear frame of claim 11, wherein said unitary frame further comprises a nose pad.

14. The eyewear frame of claim 11 further comprising a pair of temple bars pivotally attached to side edges of the frame.

15. An eyewear frame comprising:
- a unitary frame formed by a molding process wherein said frame includes an upper frame section formed from a plastic material, a lower frame section formed from a plastic material, a nose bridge section formed from an elastomeric material joining said upper and lower frame sections at a nose bridge portion, a first lateral section formed from an elastomeric material joining said upper and lower frame sections at a first lateral portion thereof, and a second lateral section formed from an elastomeric material joining said upper and lower frame sections at a second lateral portion thereof,
- said unitary frame defining first and second lens openings for receiving lenses therein
- said upper and lower frame sections being elastomerically joined and selectively movable between a first normal position wherein said unitary frame retains said lenses in said lens openings, and a second deformed position wherein said elastomeric sections are stretched and said lenses can be removed from or inserted into said lens openings.

16. The eyewear frame of claim 15, wherein the first and second lens openings each include a continuous groove for receiving the first and second lenses.

17. The eyewear frame of claim 15, wherein the frame further comprises a nose pad.

18. The eyewear frame of claim 15 further comprising a pair of temple bars pivotally attached to side edges of the frame.

* * * * *